US012750381B2

(12) United States Patent
Lazar et al.

(10) Patent No.: US 12,750,381 B2
(45) Date of Patent: Sep. 29, 2026

(54) UNSUPERVISED ANOMALY DETECTION USING LOOKAHEAD PAIRS

(71) Applicant: Intuit Inc., Mountain View, CA (US)

(72) Inventors: Racheli Lazar, Tel Aviv (IL); Liora Braunstein, Tel Aviv (IL)

(73) Assignee: Intuit Inc., Mountain View, CA (US)

( * ) Notice: Subject to any disclaimer, the term of this patent is extended or adjusted under 35 U.S.C. 154(b) by 282 days.

(21) Appl. No.: 18/427,108

(22) Filed: Jan. 30, 2024

(65) Prior Publication Data

US 2025/0247405 A1 Jul. 31, 2025

(51) Int. Cl.

| | |
|---|---|
| ***H04L 9/40*** | (2022.01) |
| ***H04L 41/16*** | (2022.01) |
| ***H04L 67/50*** | (2022.01) |

(52) U.S. Cl.

CPC .......... *H04L 63/1425* (2013.01); *H04L 41/16* (2013.01); *H04L 63/1416* (2013.01); *H04L 67/535* (2022.05)

(58) Field of Classification Search

CPC . H04L 63/1425; H04L 41/16; H04L 63/1416; H04L 67/535

See application file for complete search history.

(56) References Cited

U.S. PATENT DOCUMENTS

| | | | | |
|---|---|---|---|---|
| 7,900,194 | B1 * | 3/2011 | Mankins | G06F 21/554 726/25 |
| 9,342,384 | B1 * | 5/2016 | Lewis | G06F 9/547 |
| 2019/0114417 | A1 * | 4/2019 | Subbarayan | H04L 41/16 |
| 2019/0220334 | A1 * | 7/2019 | Al Sharnouby | G06F 21/56 |

OTHER PUBLICATIONS

Chandola et al., "Anomaly Detection for Discrete Sequences: A Survey," IEEE Transactions on Knowledge and Data Engineering, vol. 24, No. 5, pp. 1-16. (Year: 2012).

Forrest et al., "A Sense of Self for Unix Processes," IEEE, pp. 120-128. (Year: 1996).

Hofmeyr et al., "Intrusion Detection Using Sequences of System Calls," Journal of Computer Security 6(3), 42-total pages. (Revised: 1997).

* cited by examiner

*Primary Examiner* — Abdulkader M Alriyashi

(74) *Attorney, Agent, or Firm* — Paradice & Li LLP

(57) ABSTRACT

Systems and methods for detecting anomalies in sequences of actions using lookahead pairs (LAPs) are disclosed. An example method is performed by one or more processors of an unsupervised anomaly detection system and includes receiving, over a communications network, a sequence of actions, generating one or more LAPs of interest based on the received sequence of actions, each LAP of interest indicating a target action, an origin action, and a number of gap actions, and selectively flagging the LAPs of interest as anomalies based on whether they appear in a LAP database, the selective flagging including refraining from flagging the LAP of interest as an anomaly if it is associated with a number of observances greater than a threshold, and flagging the LAP as an anomaly if it is associated with a number of observances less than the threshold or if the LAP does not appear in the LAP database.

20 Claims, 3 Drawing Sheets

UNSUPERVISED ANOMALY DETECTION USING LOOKAHEAD PAIRS

TECHNICAL FIELD

This disclosure relates generally to anomaly detection, and specifically to training and/or using an anomaly detection system trained to detect anomalies based on comparing lookahead pairs (LAPs) generated from sequences of actions with LAPs stored in a LAP database generated in an unsupervised manner without labels for known anomalies.

DESCRIPTION OF RELATED ART

Many products and services, particularly online platforms for banking and investment management, are targets for malicious actors (or “attackers”), including hackers and fraudsters. These attackers use methods like phishing, identity theft, and fraudulent transactions to gain access to sensitive information, such as bank account and Social Security numbers, or to circumvent various rules. The attackers often exploit software vulnerabilities to achieve these goals, and their tactics may include bypassing rate limits, scraping data, embezzling funds, executing Distributed Denial-of-Service (DDOS) attacks, stealing application programming interface (API) keys, among others. Successful attacks can result in significant financial loss, compromised personal data, and a decrease in user trust in the platforms.

In response, many companies have adopted various security measures to protect against such threats. These measures include implementing multi-factor authentication (MFA), encryption, security audits, enhanced API security (e.g., with OAuth standards), log monitoring, and security key management, among other measures for safeguarding against attacks.

Some companies use various forms of anomaly detection to identify unusual user activity that might indicate malicious behavior. For instance, these processes may involve detecting patterns in discrete sequences that differ from what is typical using various statistical models and/or rule-based methods. In addition, various supervised learning models may be deployed that require extensive manual labeling of normal versus anomalous behavior, which is a resource-intensive and challenging task, particularly in high-throughput systems.

Despite these security efforts, the threat from attackers persists, and continued improvement in security strategies, such as anomaly detection systems, is needed.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

One innovative aspect of the subject matter described in this disclosure can be implemented as a computer-implemented method for detecting anomalies in sequences of actions using lookahead pairs (LAPs). An example method is performed by one or more processors of an anomaly detection system and includes receiving, over a communications network, a sequence of actions performed by a user during an active session, generating one or more LAPs of interest based on the received sequence of actions, each LAP of interest indicating a target action most recently performed by the user, an origin action performed by the user before the target action, and a number of gap actions performed by the user after the performance of the origin action and up to the performance of the target action, and selectively flagging the LAPs of interest as anomalies based on whether they appear in a LAP database including a plurality of historical LAPs each indicating a previously observed pair of actions and a number of actions observed between the previously observed pair of actions, the selective flagging including refraining from flagging the LAP of interest as an anomaly if the LAP database indicates that the LAP of interest is associated with a number of observances greater than or equal to a minimum threshold, and flagging the LAP of interest as an anomaly if the LAP database indicates that the LAP of interest is associated with a number of observances less than the minimum threshold or if the LAP of interest does not appear in the LAP database.

Another innovative aspect of the subject matter described in this disclosure can be implemented in a system for detecting anomalies in sequences of actions using lookahead pairs (LAPs). An example system includes one or more processors and a memory storing instructions for execution by the one or more processors. Execution of the instructions causes the system to perform operations including receiving, over a communications network, a sequence of actions performed by a user during an active session, generating one or more LAPs of interest based on the received sequence of actions, each LAP of interest indicating a target action most recently performed by the user, an origin action performed by the user before the target action, and a number of gap actions performed by the user after the performance of the origin action and up to the performance of the target action, and selectively flagging the LAPs of interest as anomalies based on whether they appear in a LAP database including a plurality of historical LAPs each indicating a previously observed pair of actions and a number of actions observed between the previously observed pair of actions, the selective flagging including refraining from flagging the LAP of interest as an anomaly if the LAP database indicates that the LAP of interest is associated with a number of observances greater than or equal to a minimum threshold, and flagging the LAP of interest as an anomaly if the LAP database indicates that the LAP of interest is associated with a number of observances less than the minimum threshold or if the LAP of interest does not appear in the LAP database.

Another innovative aspect of the subject matter described in this disclosure can be implemented as a non-transitory computer-readable medium storing instructions that, when executed by one or more processors of a system for detecting anomalies in sequences of actions using lookahead pairs (LAPs), cause the system to perform operations. Example operations include receiving, over a communications network, a sequence of actions performed by a user during an active session, generating one or more LAPs of interest based on the received sequence of actions, each LAP of interest indicating a target action most recently performed by the user, an origin action performed by the user before the target action, and a number of gap actions performed by the user after the performance of the origin action and up to the performance of the target action, and selectively flagging the LAPs of interest as anomalies based on whether they appear in a LAP database including a plurality of historical LAPs each indicating a previously observed pair of actions and a number of actions observed between the previously observed pair of actions, the selective flagging including refraining from flagging the LAP of interest as an anomaly if the LAP database indicates that the LAP of interest is associated with a number of observances greater than or equal to a minimum threshold, and flagging the LAP of interest as an anomaly if the LAP database indicates that the LAP of interest is associated with a number of observances less than the minimum threshold or if the LAP of interest does not appear in the LAP database.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like numbers reference like elements throughout the drawings and specification.

DETAILED DESCRIPTION

Figure 1:
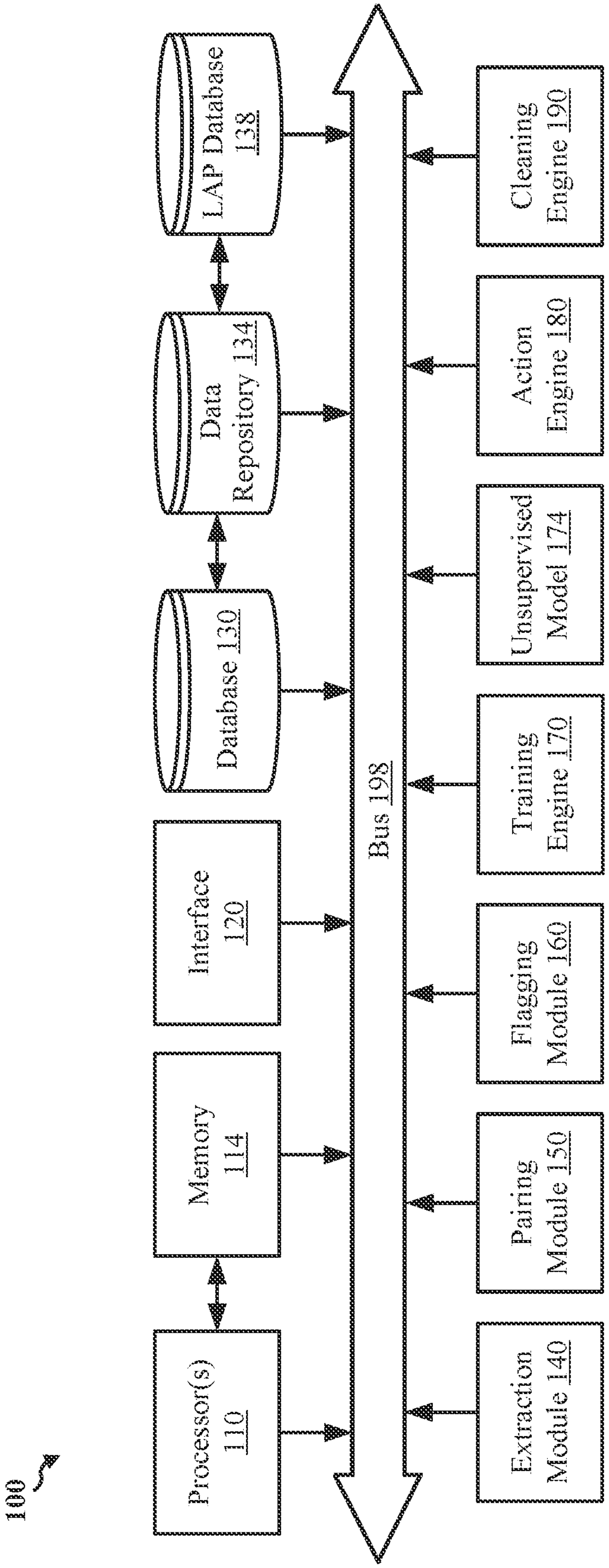
FIG. 1 shows a system, according to some implementations.

As described above, online platforms, especially in banking and investment management, are frequently targeted by malicious actors using methods like phishing, identity theft, and the exploitation of software vulnerabilities, which can lead to substantial financial losses, compromised data, and reduced user trust. Although some companies have implemented anomaly detection as a security measure, the resources required for effectively labeling behavior as normal or anomalous is daunting, particularly in high-throughput systems. Thus, improvements in anomaly detection systems are needed. Disclosed herein are systems and computer-implemented methods for detecting anomalies in sequences of user actions using lookahead pairs (LAPs), where anomalies are detected using a LAP database that is generated in an unsupervised manner from unlabeled training data including historical sequences of user actions that have not been labeled based on known anomalies.

The innovative anomaly detection system disclosed herein is configured to differentiate between normal and anomalous user behaviors in applications or services (e.g., QuickBooks) through an unsupervised learning approach. Conventional anomaly detection systems have detected anomalies using a labeling approach, by labeling previous activity as normal or anomalous, which becomes less practical as the amount of data grows. There also exists a general reluctance to use unsupervised models due to the risk of learning from erroneous data, which is a serious concern for any anomaly detection system as it could cause the model to misinterpret anomalous data as normal. Nonetheless, by employing the methods described herein, the anomaly detection system effectively implements an unsupervised machine learning technique to identify anomalies within sequences of actions. The sequences of actions may be API calls or any other suitable series of actions or requests recorded in behavior logs across various systems.

For purposes of discussion herein, each action in a sequence may serve a distinct purpose, which is common in applications where multiple steps are needed to complete an operation, such as authenticating a user, retrieving data, and then updating a database. For the example of the actions being API calls, a user's system may make a request to a second system's API to perform specific actions or retrieve specific data by sending a set of instructions, predefined commands, or queries over a network, such as with methods (or "HTTP methods") like GET, POST, PUT, or DELETE, where the API calls are made to specific endpoint URLs that correspond to various functionalities provided by the second system's API. A "call" action may be equivalent to using a particular method in conjunction with an endpoint, while a user's action could also be as simple as clicking a button on a webpage or mobile app. The anomaly detection system described herein can be trained and deployed on a network of systems where any number of users can perform actions to any number of frontend applications, backend services, or domains or servers connected to the network, while all of such actions are recorded in a log.

As further described below, the anomaly detection system generates lookahead pairs from sequences of actions without explicit labels. LAPs are particularly beneficial in predicting or analyzing user behavior in sequences, thereby enhancing the unsupervised model's ability to learn from observations based on unlabeled past data. Despite being generated in an unsupervised manner, the database of LAPs (the "LAP database" or "normal database" or "model") enables the anomaly detection system to accurately detect irregularities that may indicate malicious activity while minimizing false positives and negatives. When monitoring user actions on the network, the anomaly detection system generates LAPs from these actions and stores them in the LAP database along with other information, such as for training purposes. During detection, a sequence of actions may be flagged as anomalous if it includes one or more LAPs absent from the LAP database or observed less than a predefined minimum threshold, for example. Thus, using the LAP database, the anomaly detection system can accurately predict and/or identify potential malicious activity by examining the context within the pairs of user actions and their associated metadata.

Specifically, by analyzing sequences of user actions as LAPs, the system can make informed decisions based on the relationship between a current (or "target") action and a series of preceding (or "origin") actions by systematically pairing each new action with previous ones and quantifying the "gap" (e.g., the number of actions or calls) between them. An example normal sequence may involve a file being opened before being closed or edited a logical progression of actions. In contrast, an irregular sequence may be a file being edited before it has been opened, which may indicate that an unconventional script or process is in use. Another example suspicious LAP may include a repetition of a "credit memo" origin call and an "account" target call occurring within a minimum gap.

The use of LAPs also provides the anomaly detection system with the benefit of efficiency in data retrieval. For example, the fixed structure of LAPs (e.g., origin, gap, and target) allows for streamlined database querying. Since the target action remains constant in all pairs generated from a single sequence, the LAP structure allows for efficient indexing and data retrieval, which also improves response time in the connected applications. In some implementations, the addition of a fourth component (LAP "count") indicates a frequency of the LAP's observation, further enhancing the analysis. By comparing observed actions against a database of normal behaviors and assessing whether calls are known, new, or deviate from expected usage patterns, the anomaly detection system can autonomously flag potential anomalies for further scrutiny, proactively identify and address unusual patterns, and assist in maintaining network security and integrity across a plurality of applications, services, domains, and servers.

To note, while LAPs are not the only possible method for unsupervised learning, their application disclosed herein is a strategic choice. Alternatives, such as building extensive databases of sequences, often result in numerous false alarms (e.g., false positives and/or false negatives) due to their reliance on a particular subsequence being absent from a large database of manually labeled sequences. In contrast, using LAPs makes the data more manageable, significantly reducing the rate of false alarms, making the unsupervised anomaly detection system both practical and effective. As an example of testing the efficiency of LAPs in anomaly detection, a flag rate for basic sequence matching anomalies (e.g., which may require generating and/or storing on the order of millions of sequences) may be around 2.0% (e.g., with a window size of 6), while the flag rate when using lookahead pairs with the same data (e.g., which may only require generating and/or storing on the order of tens of thousands of triplets) may be a mere 0.02% (e.g., with a comparable lookahead window of 5). In other words, while conventional anomaly detection systems utilize fixed windows and overwhelmingly large databases of sequences that require manual labeling, such systems would result in high rates of false alarms in an unsupervised context (particularly as the dataset grows), making the task of efficiently detecting anomalies impractical and ineffective.

To address the challenges related to operating without labels, the anomaly detection system disclosed herein also integrates various practical heuristics. These processes enhance the anomaly detection system's accuracy and reliability by compensating for the risks associated with unsupervised learning, such as the risk of misidentifying anomalies as normal patterns. One of the practical heuristics includes utilizing a threshold-based criterion for anomaly detection (rather than a simple existence test), which includes determining whether the frequency of an observed LAP falls below a set threshold before flagging it as anomalous. In addition, to maintain the integrity of the LAP database, various techniques described herein filter out erroneous or anomalous data, which ensures that the anomaly detection system remains effective even as the training dataset grows and/or as standard system actions evolve. In these and other manners, the anomaly detection system can effectively overcome the challenges associated with unsupervised learning, and thus offer a more accurate, reliable, and manageable solution than conventional methods.

Aspects of the present disclosure provide significant benefits in enhancing company and customer security by identifying abusive usage and mitigating fraud within user sessions. Once trained, the anomaly detection system may be deployed as a real-time monitoring tool to analyze logs of sequences of actions (e.g., API calls or any other suitable sequence of actions) as they are generated and autonomously flag unusual activities. For instance, the anomaly detection system may be used to identify users whose usage patterns deviate from what is normal, such as when performing an abnormal order of actions or an atypical proximity of certain actions, which can signal potential security threats. Furthermore, the anomaly detection system may be deployed in various domains, such as for fraud detection (e.g., in financial transaction sequences), network or cybersecurity (e.g., through abnormal pattern identification in network logs), unusual pattern detection (e.g., social media behavior), or any other suitable environment in which sequences of actions may be logged and scrutinized.

Various implementations of the subject matter disclosed herein provide one or more technical solutions to the technical problem of improving the functionality (e.g., speed, accuracy, etc.) of computer-based systems, where the one or more technical solutions can be practically and practicably applied to improve on existing techniques for detecting anomalies. Implementations of the subject matter disclosed herein provide specific inventive steps describing how desired results are achieved and realize meaningful and significant improvements on existing computer functionality—that is, the performance of computer-based systems operating in the evolving technological field of anomaly detection systems.

FIG. 1 shows a system 100, according to some implementations. Various aspects of the system 100 disclosed herein are generally applicable for training and/or using an anomaly detection system to detect anomalies in sequences of actions using lookahead pairs (LAPs) in conjunction with a LAP database generated in an unsupervised manner. The system 100 includes a combination of one or more processors 110, a memory 114 coupled to the one or more processors 110, an interface 120, one or more databases 130, a data repository 134, a LAP database 138, an extraction module 140, a pairing module 150, a flagging module 160, a training engine 170, an unsupervised model 174, an action engine 180, and/or a cleaning engine 190. In some implementations, the various components of the system 100 are interconnected by at least a data bus 198. In some other implementations, the various components of the system 100 are interconnected using other suitable signal routing resources.

The processor 110 includes one or more suitable processors capable of executing scripts or instructions of one or more software programs stored in the system 100, such as within the memory 114. In some implementations, the processor 110 includes a general-purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In some implementations, the processor 110 includes a combination of computing devices, such as a combination of a DSP and a microprocessor, a plurality of microprocessors, one or more microprocessors in conjunction with a DSP core, or any other suitable configuration. In some implementations, the processor 110 incorporates one or more graphics processing units (GPUs) and/or tensor processing units (TPUs), such as for processing a large amount of data.

The memory 114, which may be any suitable persistent memory (such as non-volatile memory or non-transitory memory) may store any number of software programs, executable instructions, machine code, algorithms, and the like that can be executed by the processor 110 to perform one or more corresponding operations or functions. In some implementations, hardwired circuitry is used in place of, or in combination with, software instructions to implement aspects of the disclosure. As such, implementations of the subject matter disclosed herein are not limited to any specific combination of hardware circuitry and/or software.

The interface 120 is one or more input/output (I/O) interfaces for receiving (e.g., over a communications network) transmissions, input data, and/or instructions from a computing device of a user, outputting data (e.g., over the communications network) to the computing device of the user, hosting a session for the user, selectively performing one or more preemptive actions associated with the user's behavior, corresponding with any of the plurality of applications, services, domains, servers, and/or the anomaly detection system, or the like. The interface 120 may also be used to access, manipulate, or otherwise interact with the data stored in one or more of the database 130, the data repository 134, or the LAP database 138. In some implementations, the interface 120 is used to provide or receive other suitable information, such as computer code for updating one or more programs stored on the system 100, instructions, actions, calls, internet protocol requests and results, or the like. An example interface includes a wired interface or wireless interface to the internet or other means to communicably couple with user devices or any other suitable devices. In an example, the interface 120 includes an interface with an ethernet cable to a modem, which is used to communicate with an internet service provider (ISP) directing traffic to and from user devices and/or other parties. In some implementations, the interface 120 is also used to communicate with another device within the network to which the system 100 is coupled, such as a smartphone, a tablet, a personal computer, or other suitable electronic device. In various implementations, the interface 120 includes a display, a speaker, a mouse, a keyboard, or other suitable input or output elements that allow interfacing with the system 100 by a local user or moderator.

The database 130 stores data associated with the system 100, such as data objects, algorithms, weights, models, modules, engines, user information, values, ratios, historical data, recent data, current or real-time data, files, plugins, extracted data and/or metadata, arrays, tags, identifiers, calls, requests, prompts, queries, replies, insights, formats, characteristics, features, and/or components, among other suitable information, such as in one or more JavaScript Object Notation (JSON) files, comma-separated values (CSV) files, or other suitable data objects for processing by the system 100, one or more Structured Query Language (SQL) compliant data sets for filtering, querying, and sorting by the system 100 (e.g., the processor 110), or any other suitable format. In various implementations, the database 130 is a part of or separate from the data repository 134, the LAP database 138, and/or another suitable physical or cloud-based data store. In some implementations, the database 130 includes a relational database capable of presenting information as data sets in tabular form and capable of manipulating the data sets using relational operators.

The data repository 134 stores data associated with sessions, sequences of actions, LAPs, and/or associated metadata, or any other suitable data representative of user actions. In some implementations, a number of the LAPs may be stored in the data repository 134 (or another suitable database) for other purposes. For instance, the data repository 134 may be a data lake, and the LAPs may be stored within for offline training purposes. In such implementations, the LAP database 138 may be written to the data repository 134 in a flat structure. In various implementations, the data repository 134 is a part of or separate from the database 130 and/or the LAP database 138. In some instances, the data repository 134 includes data stored in one or more cloud object storage services, such as one or more Amazon Web Services (AWS)-based Simple Storage Service (S3) buckets. In some implementations, all or a portion of the data is stored in a memory separate from the data repository 134, such as in the database 130, the LAP database 138, and/or another suitable data store.

The LAP database 138 stores data associated with LAPs, such as the LAPs themselves, or any other suitable data associated with LAPs. In various implementations, the LAP database 138 is a part of or separate from the database 130 and/or the data repository 134. In some instances, the LAP database 138 includes data stored in one or more cloud object storage services, such as one or more Amazon Web Services (AWS)-based Simple Storage Service (S3) buckets. In some implementations, all or a portion of the data is stored in a memory separate from the LAP database 138, such as in the database 130, the data repository 134, and/or another suitable data store.

The LAP database 138 is generated in an unsupervised manner from unlabeled training data based on user activities captured during historical sessions. The user activity may be stored (e.g., in the database 130 and/or the data repository 134) as sequences of historical user actions obtained from user behavior logs (or "activity logs") across various applications, services, domains, and/or servers. The sequences are not associated with predefined labels for known anomalies. The LAPs themselves are stored in the LAP database 138, also without any predefined labels for known anomalies. As further described with respect to the pairing module 150, each LAP is formed to include a pair of user actions (or "calls") and the gap between them, such as (Origin Action, Gap, Target Action). The gap between the actions may have a threshold maximum gap, which may also be referred to herein as a "lookahead window" or 'k', as further described with respect to the extraction module 140.

The user activities from the behavior logs are "sessionized"—that is, grouped into sessions representing a continuous or related series of activities performed by a user within a certain timeframe. In this manner, patterns may be analyzed over a sequence of activities rather than isolated events, as further described with respect to the extraction module 140. Each action in the log includes a timestamp indicating a time when the action was executed or performed, which can help determine whether an action is part of an ongoing series of activities (and thus part of the active session) or if it represents the start of a new session. The timestamps remain associated with the actions in the LAP database 138 for further processing. To maintain the relevance of sessions, a time gap between any two consecutive actions within a historical session used for training does not exceed a first specified maximum duration (or "training idle duration"), and a time gap between any two consecutive actions within an active session used for real-time detection does not exceed a second specified maximum duration (or "real-time idle duration") less than the first specified maximum duration. For example, the real-time idle duration may be 1 minute, while the training idle duration may be 10 minutes, which allows for more proactive detection during real-time deployment and more comprehensive learning during offline training. Furthermore, sessions that include less than two performed actions are filtered out as they will not apply to the LAP format. In some instances, to maintain the integrity of the LAP database 138, actions with unknown (NULL) users or unresolved (NULL) endpoints may also be filtered out. In some implementations, the sessions are stored along with information indicating a start time or "startHour" for the session, which may be strategically rounded-down to standardize the timestamps for the sessions. In these and others manners, user activities are accurately segmented into distinct, relevant sessions, which allows for enhanced pattern recognition and thus, more effective anomaly detection.

In some implementations, the LAP database 138 is generated on a per-partition basis and may be initially formed as a particular data structure configured for efficient data manipulation and analysis, such as a pandas DataFrame data structure (e.g., in Python). To efficiently compile the LAP database 138, the sessions described above may be grouped based on certain parameters, such as a "userCluster" parameter and/or the "startHour" parameter mentioned above. In this manner, each session may be uniquely identified by a combination of a user identifier and a user cluster (or group) identifier. Once grouped, each session may be processed (e.g., using pandas) into smaller, more manageable segments. In some aspects, one or more tools configured for handling large datasets may be used for the processing, such as pyspark. In this manner, the pandas segments may be converted into pyspark segments, for example, and then concatenated to form a single, comprehensive database, i.e., the LAP database 138. This process may be performed on a periodic basis. Although the process may result in the LAP database 138 including one or more duplicate LAPs, the duplicates may be removed with various aggregation techniques, such as sum, min, and/or max, as further described in connection with the cleaning engine 190.

As the LAP database 138 is used in real-time detection modes, it is optimized for efficient access. For example, the LAP database 138 may incorporate one or more aspects of a database configured for fast lookup that can handle large datasets while maintaining high performance, such as Amazon's Mongo DB, wherein the LAPs may be indexed by "target" action. In some other implementations, the LAP database 138 incorporates aspects of a nested tree of sequences to enable efficient searching for LAPs in real-time detection mode. In some instances, the LAP database 138 incorporates a NumPy 2D array to enable fast computation of Hamming distances. In some other instances, the LAP database 138 incorporates a doubly nested dictionary to further enable efficient access to the LAPs stored within. Furthermore, objects within the LAP database 138 may be flattened and serialized to comma-separated values (CSV) for efficient storage and manipulation. As mentioned above, the LAPs may also be stored in the data repository 134, such as for offline training purposes, and in such implementations, all or a portion of the LAP database 138 may be written to the data repository 134 in a flat structure.

Each respective LAP may be stored in the LAP database 138 along with various additional information (or "metadata") associated with the respective LAP. The extraction module 140 may obtain the additional information associated with the LAPs from the activity logs, and provide the additional information to the pairing module 150 such that the additional information will be stored in association with the corresponding LAPs in the LAP database 138. In this manner, the LAP database 138 may store various historical details for each LAP (which may be updated periodically), such as the total number of sessions in which the LAP has been observed, the frequency of observations across these sessions, the date of the first observation of the LAP, and the date of the most recent observation of the LAP. As mentioned above, each session may be stored with a rounded-down timestamp, which can be used in combination with the total number of sessions in which each LAP is observed and the frequency of such observations to determine the first and last observation dates for each LAP in an efficient and consistent manner. As further described with respect to the cleaning engine 190, some of the historical details may be used to augment or otherwise enhance the LAP database 138. For example, the integrity of the LAP database 138 may be improved by removing LAPs that have been observed in less than a threshold number of sessions or that have not been observed since a date beyond a threshold.

The extraction module 140 may be used to receive, or otherwise obtain, a sequence of actions performed by a user during an active session. The sequence of actions may be received over a communications network, such as from an activity log generated based on a feed of actions performed by a user in real-time, where the user is performing the actions via an interface (e.g., the interface 120) communicably coupled to a computing device of the user. It is to be understood that the extraction module 140 may receive sequences of actions via any suitable interface in connection with any number of user sessions during which any number of users is performing any number of actions using any variety of applications, services, domains, or servers from which one or more activity logs are generated. In some aspects, the activity logs are encrypted and stored in the database 130 and/or the data repository 134. As one example, the activity logs may be generated by an API server if the actions are API calls. The extraction module 140 may process the data from the activity logs, such as in conjunction with one or more cleaning operations, to transform the data into a format suitable for machine learning algorithms.

As described above with respect to the LAP database 138, the extraction module 140 segments (or "sessionizes") the user actions obtained from the behavior logs into sessions using timestamps. The extraction module 140 also applies filters to the sessions, such as based on idle duration gaps between actions (e.g., 1 minute for active, real-time sessions) and the number of actions in the sessions, such as by excluding sessions that have a number of actions below a threshold or that have actions associated with unresolved user information and/or endpoint information. In some implementations, a real-time (or "active") session is deemed to have concluded when the user's inactivity period exceeds 1 minute, and a training purposes (or "historical") session is deemed to have concluded when the user's inactivity period exceeds 10 minutes. The extraction module 140 also enables additional functionality by extracting and storing other information from the activity logs and storing the information as LAP metadata, such as the frequency and total number of sessions in which each LAP appears, and the dates of the first and most recent observations for the LAPs. In these and other manners, the extraction module 140 ensures that the LAP database 138 is continuously updated with useful information about the LAPs.

Once the extraction module 140 sessionizes the user actions according to the idle time parameter, the extraction module 140 may also be used to arrange the user actions in a manner that allows LAPs to be generated from them, as described by examples below with respect to the pairing module 150. Specifically, the extraction module 140 may arrange the user actions performed from the start to the end of a given session in a reverse chronologically ordered list. In this manner, the pairing module 150 will be enabled to generate each LAP to include a pair of target and origin actions and the interval or 'gap' between them. As mentioned above, the gap duration or interval may be limited by a maximum threshold referred to as the "lookahead window" ('k'), which may be a positive integer. In practice, the gap threshold for action sequences may be a relatively small number (e.g., 4), as the relevance of the gap diminishes with its length, i.e., longer intervals provide less insight into user activity patterns.

The extraction module 140 utilizes a deque, or double-ended queue, to efficiently manage the sessions and sequences of actions in reverse chronological order. The deque is configured to store a predefined number of most recent actions performed by a user, and the deque structure allows actions to be efficiently inserted and removed from both ends of the queue. In some aspects, each action is associated with its corresponding session based on an identity of the user performing the action, a cluster to which the performing user is assigned, and/or associated timestamps. Once the LAPs have been generated for a sequence of actions in an active session, the active session is updated to discard the oldest action and add the latest action, thus forming an updated, time-reversed sequence of actions to be transformed into additional LAPs of interest. The extraction module 140 may incorporate one or more for-loop mechanisms for systematically extracting the actions from the logs in this reverse chronological order, and this iterative process may continue until no further LAPs can be generated from the deque's current sequence of actions within a given session.

The pairing module 150 may be used to generate a set of LAPs of interest using the sequence of user actions from the extraction module 140. Each LAP includes a most recent ("target") action performed by the user, an earlier ("origin") action performed by the user, and the count of intermediate actions ("gap" actions) that occurred between the origin and target actions, which may be represented as (Origin Action, Gap, Target Action). To note, during training, the pairing module 150 is used to generate LAPs from the training data (e.g., historical sessions), whereas in real-time deployment, the pairing module 150 is used to autonomously generate LAPs from the ongoing stream of actions flowing from active sessions. In either scenario, upon receiving the arranged actions for a session from the extraction module 140, the pairing module 150 systematically iterates through the actions within the session according to the maximum lookahead value ('k'). Specifically, for each action, the pairing module 150 generates one or more LAPs by designating the new action as the "target" action and pairing it with one or more earlier actions labeled as the "origin" action(s). The LAP generation starts with the most recent action and moves backward, creating a series of pairs where the 'gap' incrementally increases by one in each subsequent pair.

As an example, if the most recent action is F, and the previous actions are E, D, C, B, and A, the pairing module 150 will generate the following LAPs for "target" action F if k=5: (E, 1, F), (D, 2, F), (C, 3, F), (B, 4, F), and (A, 5, F), where each LAP includes a different origin action, the fixed target action, and the gap count. In another example sequence of actions ABCDBC, the gap (or "distance") between actions A and (the first) B is 1, between A and (the first) C is 2, and between A and D is 3. For this example, if 'k' is 3, the pairing module 150 will generate the following LAPs of interest from the sequence of actions: (A, 1, B), (A, 2, C), (A, 3, D), (B, 1, C), (B, 2, D), (B, 3, B), (C, 1, D), (C, 2, B), (C, 3, C), (D, 1, B), (D, 2, C), and (B, 1, C). If 'k' is 4, the pairing module 150 will also generate the following additional LAPs of interest from the sequence of actions: (A, 4, B) and (B, 4, C). As another example, a sequence of API calls may include, in order, a POST query, a GET bill, a GET bill, a GET invoice, and a POST transfer. For this example, if 'k' is 4, the pairing module 150 will generate the following LAPs from the sequence of API calls: (POST query, 1, GET bill), (POST query, 2, GET bill), (POST query, 3, GET invoice), (POST query, 4, POST transfer), (GET bill, 1, GET bill), (GET bill, 2, GET invoice), and so on. In some implementations, lookahead triples, lookahead quadruples, or otherwise lookahead n-tuples may be generated if more context could be beneficial, such as with highly complex tasks or sequences. It is to be understood that, in order to maintain efficiency, conserve memory, and avoid normalizing all action sequences, the pairing module 150 does not generate LAPs for every possible combination of actions. For example, rather than storing a detailed 5-tuple for a sequence of actions ABCDE, a higher-level 2-tuple LAP (e.g., A, 4, E) is stored. This is in contrast with a conventional method of generating subsequences from consecutive actions within a set window (e.g., 3), which may result in subsequences like (POST query, GET bill, GET bill), (GET bill, GET bill, GET invoice), (GET bill, GET invoice, POST transfer), and the like. By maintaining a fixed target action across all pairs, the pairing module 150 enhances the efficiency of data analysis and retrieval, particularly for large datasets. Furthermore, by including the gap count, the pairing module 150 provides context about the proximity of actions within a user's sequence of actions, which allows for a deeper understanding of the user's behavior patterns. Upon generating the LAPs of interest, the pairing module 150 provides the LAPs of interest to the flagging module 160 for further processing.

Upon obtaining the LAPs of interest from the pairing module 150, the flagging module 160 may be used to identify and flag particular ones of the LAPs of interest as anomalies. Specifically, the flagging module 160 selectively flags the LAPs of interest as anomalies based on a comparison of each LAP of interest with the historical LAPs stored in the LAP database 138. As described above, each LAP stored in the LAP database 138 is associated with metadata indicating a number of times the specified pair of actions has been observed with the specified gap. For each LAP of interest, if the LAP database 138 shows that the LAP of interest has been observed a number of times equal to or greater than a specified minimum threshold, the LAP of interest is not flagged as an anomaly. In other words, if the count is equal to or greater than the threshold, it suggests that the LAP of interest is a common or expected sequence and thus, not considered an anomaly. In contrast, if the LAP of interest is associated with fewer observations than the minimum threshold (or does not appear within the LAP database 138), the LAP of interest is generally flagged as an anomaly. In other words, a count less than the threshold indicates that the LAP of interest is unusually rare or unexpected, and thus, it is flagged as an anomaly.

In some implementations, upon determining the count for the LAP of interest within the LAP database 138, the flagging module 160 also normalizes the count. Specifically, the flagging module 160 normalizes the count by the total number of pairs in the corresponding sequence of actions, which may be represented by the following formula: $(n*k-k(k+1)/2)$, where 'n' represents the total number of events in the sequence, and 'k' represents the lookahead window or 'gap' applied to the corresponding sequence of actions. By applying this formula, the flagging module 160 adjusts for a potential overestimation of pairs towards the end of the sequence. Specifically, the product $n*k$ provides a preliminary count of pairs, assuming each action in the sequence can pair with k subsequent actions. However, towards the end of the sequence, this assumption does not hold true because fewer actions are available to form pairs. Thus, the formula subtracts k(k+1)/2) from n*k to remove the number of pairs that cannot exist due to the decreasing availability—in other words, subtracting k(k+1)/2) accounts for the diminishing number of possible pairs towards the end of the sequence.

In some implementations, if the LAP of interest is not found in the LAP database 138, the flagging module 160 performs one or more additional steps. For instance, the flagging module 160 may determine if the corresponding origin action and target action are "known," such as by determining whether they appear in an "action vocabulary." The action vocabulary may list each previously observed LAP from the historical data, and may be stored in the database 130, data repository 134, LAP database 138, or another suitable database. If both the origin and target actions are known (i.e., found in the action vocabulary), yet the LAP of interest is not found in the LAP database 138, the flagging module 160 may behave as if the LAP of interest has a count of zero, and thus, flag the LAP of interest as an anomaly. In this example, although the individual actions are recognized, their particular sequence (and gap) is unknown or rare. In contrast, if the origin and/or target actions are not known (i.e., not found in the action vocabulary), the flagging module 160 may make another determination before determining whether to flag the corresponding LAP of interest as an anomaly. In some implementations configured to emphasize flagging unfamiliar endpoints, the flagging module 160 may flag such occurrences as anomalies. In some other implementations, the flagging module 160 may refrain from flagging such occurrences as anomalies, such as when the system is configured to err on the side of less anomalies or when there is less concern with unfamiliar endpoints. In some instances, whether or not the LAP of interest is flagged as an anomaly, if the target action and/or origin action are not known, the flagging module 160 is configured to flag the unknown action(s) such that further action can be taken if needed, such as by the action engine 180.

In some implementations, upon determining that the LAP of interest is associated with fewer observations than the minimum threshold (or does not appear within the LAP database 138), the flagging module 160 refrains from flagging the LAP of interest as an anomaly until the potentially anomalous LAP of interest is deemed anomalous above a scoring threshold. Specifically, the flagging module 160 may then proceed to generate an anomaly score for the potentially anomalous LAP of interest, such as based on various metadata associated with the LAP of interest in the LAP database 138. For instance, the anomaly score may be based on a number of historical failures associated with the LAP of interest, a confidence value associated with the LAP of interest, an in/out-degree associated with the LAP of interest, or the like. In some instances, the anomaly score is generated from a combination of such weighted factors, which may be preselected based on the use case. In such implementations, upon determining the anomaly score, the flagging module 160 compares the anomaly score with an anomaly score threshold, and refrains from flagging the LAP of interest as an anomaly unless the generated anomaly score is greater than the anomaly score threshold. In other words, in such implementations, the pairing module 150 only flags the LAP of interest as an anomaly if its anomaly score exceeds the anomaly score threshold.

The training engine 170 may be used in conjunction with the unsupervised model 174 to generate the LAP database 138, such as based on the unlabeled historical sequences extracted from the historical sessions stored in the data repository 134. In some implementations, the trained unsupervised model 174 is used to generate the anomaly scores described above. The unsupervised model 174 may be a type of machine learning model or one or more algorithms that learn patterns, clusters, associations, and structures from data without being explicitly programmed with the correct answers or labels. The training may occur offline (i.e., not in real-time). Certain parameters may be preselected for training the model, as determined by the use case. Various algorithms and techniques may be suitable for training the unsupervised model to learn based on LAPs, such as autoencoders (e.g., recurrent neural networks (RNNs)), sequence-to-sequence models, generative adversarial networks (GANs), long short-term memory (LSTM) networks, gated recurrent units (GRUs), self-organizing maps (SOMs), hidden Markov models (HMMs), or other suitable algorithms or techniques suitable for training a model on sequential data in an unsupervised manner. The training engine 170 may validate the trained model on a separate dataset to evaluate its performance. Furthermore, the trained model may be periodically updated in an incremental manner for continuous learning—that is, the unsupervised model may be regularly retrained with newly extracted sequences of actions to adapt to changing action behavior patterns.

The action engine 180 may be used to perform one or more actions related to LAPs flagged as anomalies. For instance, if the flagging module 160 flags a LAP of interest as an anomaly, the action engine 180 may report the anomaly to an administrator, generate one or more alerts, initiate an investigation, and/or autonomously perform one or more preventive actions to preempt the associated user from performing the associated action(s) and/or one or more subsequent actions, such as by restricting the user's access, disabling the user's API key, blocking the user's IP address, or the like.

The cleaning engine 190 may be used to augment or otherwise enhance the LAP database 138. As mentioned above, the LAP database 138 stores certain metadata about each LAP, such as the total number of observances of the LAP ("count"), the total number of sessions in which the LAP has been observed ("sessionCount"), the first date the LAP was observed ("firstSeen"), the most recent date the LAP was observed ("lastSeen"), and the like. As non-limiting examples of using the metadata to augment the LAP database 138, the cleaning engine 190 may selectively remove LAPs that are associated with a total number of sessions ("sessionCount") falling below a specified threshold, or the cleaning engine 190 may selectively remove LAPs that are associated with a last seen date ("lastSeen") passing a predetermined limit.

As mentioned above, the LAP database 138 may sometimes include duplicate LAPs, which the cleaning engine 190 can be used to aggregate. As one example, to aggregate the LAPs and remove the duplicates, the cleaning engine 190 may group the rows in the LAP database 138 by "origin", "gap", and "target", aggregate the "count" and "sessionCount" columns by their sums, aggregate the "firstSeen" column by min, and aggregate the "lastSeen" column by max. In other words, for each LAP, the cleaning engine 190 determines a total "count", a total "sessionCount", a "firstSeen", and a "lastSeen", allowing various additional determinations to be made. For instance, it would be expected that LAPs with a relatively high "count" would have a relatively high "sessionCount". In contrast, if a particular LAP has a relatively high "count" but a very low "sessionCount", the particular LAP may be flagged as suspicious, such as by the flagging module 160. Additionally, to maintain the integrity of the LAP database 138, the cleaning engine 190 may remove the particular LAP from the LAP database 138 according to a retention policy that mandates that LAPs associated with a "sessionCount" below a minimum threshold be periodically removed from the LAP database 138. The retention policy may also mandate that LAPs that have not been observed for a long period (i.e., their associated "lastSeen" metadata is a date long in the past) also be removed from the LAP database 138. By regularly applying the retention policies, the cleaning engine 190 prevents the unsupervised model 174 from learning that LAPs that have become obsolete or irrelevant are "normal," which could otherwise become attractive targets for malicious actors.

The extraction module 140, the pairing module 150, the flagging module 160, the training engine 170, the action engine 180, and/or the cleaning engine 190 are implemented in software, hardware, or a combination thereof. In some implementations, any one or more of the extraction module 140, the pairing module 150, the flagging module 160, the training engine 170, the action engine 180, or the cleaning engine 190 is embodied in instructions that, when executed by the processor 110, cause the system 100 to perform operations. In various implementations, the instructions of one or more of said components, the interface 120, the data repository 134, and/or the LAP database 138, are stored in the memory 114, the database 130, or a different suitable memory, and are in any suitable programming language format for execution by the system 100, such as by the processor 110. It is to be understood that the particular architecture of the system 100 shown in FIG. 1 is but one example of a variety of different architectures within which aspects of the present disclosure can be implemented. For example, in some implementations, components of the system 100 are distributed across multiple devices, included in fewer components, and so on. While the below examples of adapting an onboarding session to a user are described with reference to the system 100, other suitable system configurations may be used.

Figure 2:
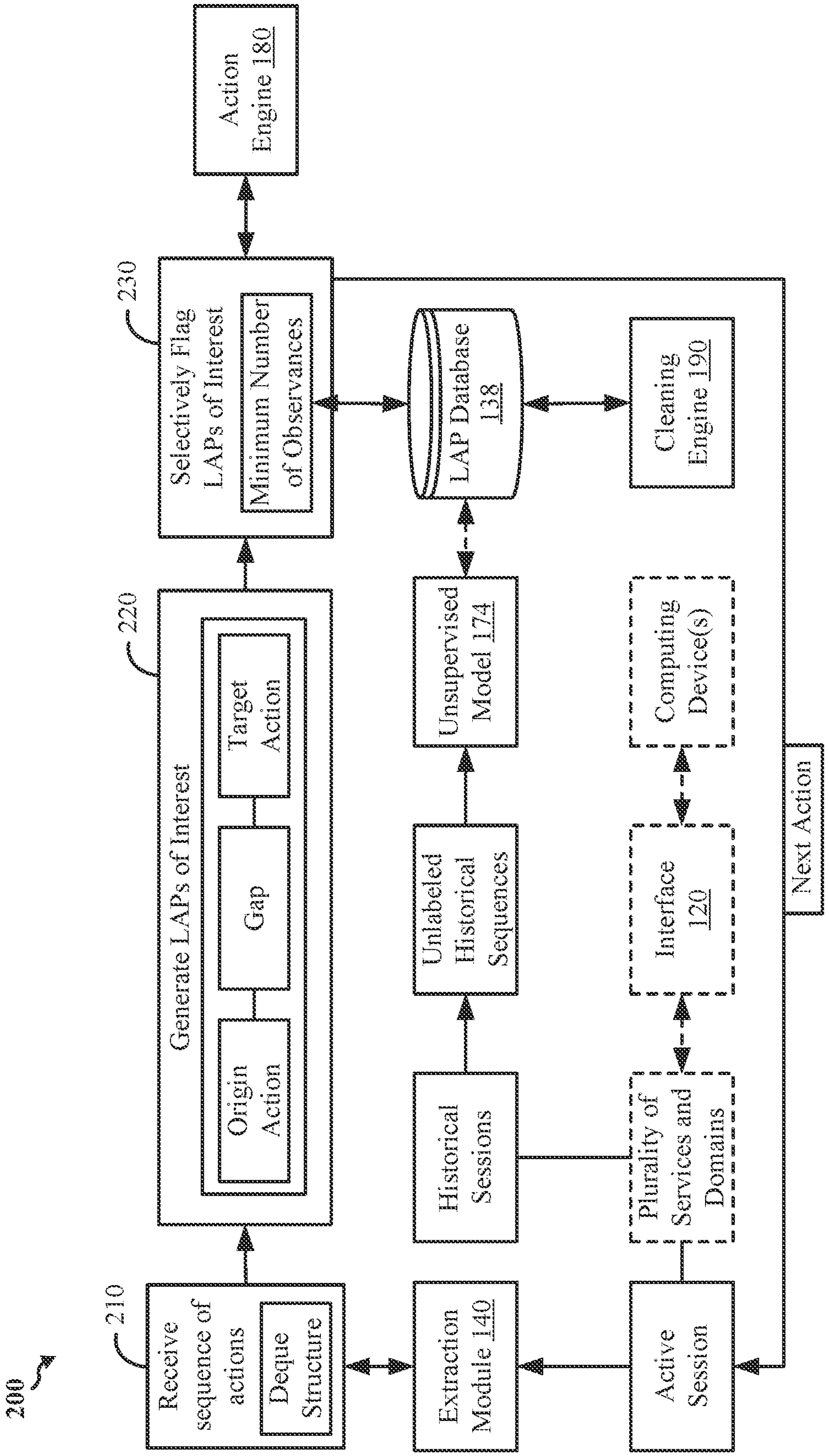
FIG. 2 shows a high-level overview of an example process flow employed by a system, according to some implementations.

FIG. 2 shows a high-level overview of an example process flow 200 employed by a system, according to some implementations, during which an anomaly detection system detects anomalies in sequences of actions using lookahead pairs (LAPs). In various implementations, the system incorporates one or more (or all) aspects of the system 100. In some implementations, various aspects described with respect to FIG. 1 are not incorporated, such as the data repository 134, the training engine 170, the action engine 180, and/or the cleaning engine 190.

In some implementations, prior to block 210, the system 100 receives (e.g., via the interface 120) instructions from one or more computing devices associated with one or more users, where the instructions are for performing one or more actions using one or more applications, services, domains, and/or servers associated with the one or more users. In some instances, the instructions are sessionized (e.g., by the extraction module 140) and stored as "historical sessions" (e.g., in the data repository 134), rearranged into unlabeled historical sequences (e.g., by the extraction module 140), and fed to the unsupervised model 174, such as for training purposes. The unsupervised model 174 may be used in conjunction with the training engine 170 to generate the LAP database 138, for example. In some other instances, the instructions are sessionized (e.g., by the extraction module 140) and stored as at least one "active session."

Thus, the system 100 receives a transmission over a communications network from a computing device associated with a user of the anomaly detection system. Specifically, at block 210, the system 100 receives a sequence of actions performed by a user during an active session. In various aspects, the received sequence of actions includes a predefined number of most recent actions performed by the user, a duration between two consecutive actions in the active session does not exceed a maximum real-time idle duration, and the predefined number of most recent actions are stored in a deque data structure in reverse chronological order.

At block 220, the system 100 generates one or more LAPs of interest based on the received sequence of actions, where each LAP of interest indicates a target action most recently performed by the user, an origin action performed by the user before the target action, and a number of gap actions performed by the user after the performance of the origin action and up to the performance of the target action. In some aspects, for each LAP of interest, the number of gap actions is less than or equal to a maximum lookahead value.

At block 230, the system 100 selectively flags the LAPs of interest as anomalies based on whether they appear in a LAP database (e.g., the LAP database 138). In some aspects, the LAP database 138 includes a plurality of historical LAPs each indicating a previously observed pair of actions and a number of actions observed between the previously observed pair of actions. In some implementations, the selective flagging includes refraining from flagging the LAP of interest as an anomaly if the LAP database 138 indicates that the LAP of interest is associated with a number of observances greater than or equal to a minimum threshold, and flagging the LAP of interest as an anomaly if the LAP database 138 indicates that the LAP of interest is associated with a number of observances less than the minimum threshold or if the LAP of interest does not appear in the LAP database 138.

In some aspects, the LAP database 138 is generated based on actions performed by users during a plurality of sessions associated with a plurality of services hosted on a plurality of domains. In some other aspects, the LAP database 138 indicates a time at which each action was performed, and a duration between two consecutive actions in any given session does not exceed a maximum training idle duration. In some other aspects, sessions including less than two performed actions are excluded from the LAP database 138. In some other aspects, the LAP database 138 indicates, for each historical LAP, at least one of a total number of sessions during which the historical LAP was observed, a total number of observances of the historical LAP over the total number of sessions, an initially seen date indicating an earliest time that the historical LAP was observed, or a last seen date indicating a most recent time that the historical LAP was observed. In some other aspects, at least one of the total number of sessions, the total number of observances, the initial date, or the last date are used (e.g., by the cleaning engine 190) to augment the LAP database 138, wherein augmenting the LAP database includes at least one of discarding LAPs associated with a total number of sessions below a threshold or discarding LAPs associated with a last seen date exceeding a threshold. In some aspects, the LAP database 138 is generated in an unsupervised manner from unlabeled training data including historical sequences of actions performed by historical users during historical sessions, wherein the historical sequences of actions are not labeled based on known anomalies.

In some implementations, after block 230, the system 100 outputs the flagged LAPs to the action engine 180 for further action.

Figure 3:
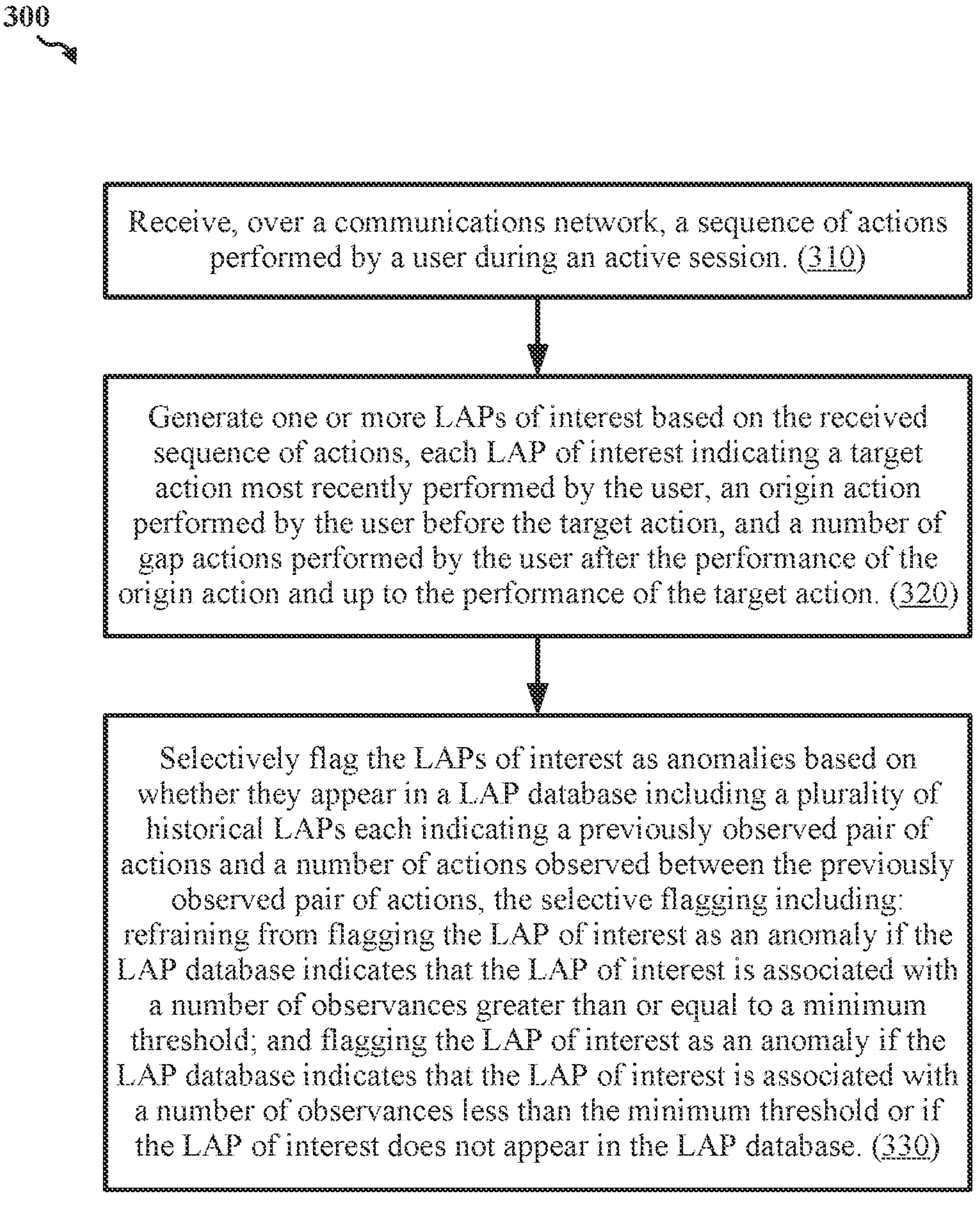
FIG. 3 shows an illustrative flowchart depicting an example operation for adapting an onboarding session to a user, according to some implementations.

FIG. 3 shows a high-level overview of an example process flow 300 employed by the system 100 of FIG. 1 and/or the system described with respect to FIG. 2, according to some implementations, during which an anomaly detection system detects anomalies in sequences of actions using lookahead pairs (LAPs). At block 310, the system 100 receives, over a communications network, a sequence of actions performed by a user during an active session. At block 320, the system 100 generates one or more LAPs of interest based on the received sequence of actions, each LAP of interest indicating a target action most recently performed by the user, an origin action performed by the user before the target action, and a number of gap actions performed by the user after the performance of the origin action and up to the performance of the target action. At block 330, the system 100 selectively flags the LAPs of interest as anomalies based on whether they appear in a LAP database including a plurality of historical LAPs each indicating a previously observed pair of actions and a number of actions observed between the previously observed pair of actions, the selective flagging including refraining from flagging the LAP of interest as an anomaly if the LAP database indicates that the LAP of interest is associated with a number of observances greater than or equal to a minimum threshold, and flagging the LAP of interest as an anomaly if the LAP database indicates that the LAP of interest is associated with a number of observances less than the minimum threshold or if the LAP of interest does not appear in the LAP database.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other suitable configuration. In some implementations, particular processes and methods are performed by circuitry specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification can also be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. For example, while the figures and description depict an order of operations in performing aspects of the present disclosure, one or more operations may be performed in any order or concurrently to perform the described aspects of the disclosure. In addition, or in the alternative, a depicted operation may be split into multiple operations, or multiple operations that are depicted may be combined into a single operation. Thus, the claims are not intended to be limited to the implementations shown herein but are to be accorded the widest scope consistent with this disclosure and the principles and novel features disclosed herein.

What is claimed is:

1. A computer-implemented method for detecting anomalies in sequences of actions using lookahead pairs (LAPs), the method performed by one or more processors of an anomaly detection system and comprising:

receiving, over a communications network, a sequence of actions performed by a user during an active session;

generating a set of LAPs of interest based on the received sequence of actions, wherein generating the set of LAPs of interest includes:

storing recent actions of the sequence of actions in a data structure;

designating a most recent action of the stored recent actions as a fixed target action; and iterating backward through previous actions in the data structure and pairing the fixed target action with one or more of the previous actions, wherein for each respective previous action encountered during the backward iteration, a LAP of interest is generated that indicates (i) the fixed target action most recently performed by the user, (ii) the respective previous action performed by the user before the fixed target action, and (iii) a determined count of intermediate gap actions performed by the user after the performance of the respective previous action and up to the performance of the fixed target action; and selectively flagging the set of LAPs of interest as anomalies based on whether they appear in a LAP database including a plurality of historical LAPs each indicating a previously observed pair of actions and a count of intermediate actions observed between the previously observed pair of actions, the selective flagging including, for each respective LAP of interest:

refraining from flagging the respective LAP of interest as an anomaly if the LAP database indicates that the respective LAP of interest is associated with a frequency count of observances greater than or equal to a minimum threshold; and flagging the respective LAP of interest as an anomaly if the LAP database indicates that the respective LAP of interest is associated with a frequency count of observances less than the minimum threshold or if the respective LAP of interest does not appear in the LAP database.

2. The method of claim 1, wherein:

storing the recent actions of the sequence of actions in the data structure includes:

storing a predefined number of the recent actions in a deque data structure in reverse chronological order; and generating the set of LAPs of interest further includes, for each respective recent action in the sequence of actions:

discarding an oldest action from the deque data structure; and adding the respective recent action to the deque data structure prior to designating the respective recent action as the fixed target action.

3. The method of claim 1, wherein a duration between two consecutive actions in the active session does not exceed a maximum real-time idle duration.

4. The method of claim 1, wherein, for each respective LAP of interest, the determined count of intermediate gap actions is less than or equal to a maximum lookahead value.

5. The method of claim 1, wherein the LAP database is generated based on actions performed by users during a plurality of sessions associated with a plurality of services hosted on a plurality of domains.

6. The method of claim 5, wherein the LAP database indicates a time at which each action was performed, and wherein a duration between two consecutive actions in any given session does not exceed a maximum training idle duration.

7. The method of claim 5, wherein sessions including less than two performed actions are excluded from the LAP database.

8. The method of claim 5, wherein the LAP database indicates, for each historical LAP, at least one of a total number of sessions during which the historical LAP was observed, a total frequency count of observances of the historical LAP over the total number of sessions, an initially seen date indicating an earliest time that the historical LAP was observed, or a last seen date indicating a most recent time that the historical LAP was observed.

9. The method of claim 8, wherein at least one of the total number of sessions, the total frequency count of observances, the initially seen date, or the last seen date are used to augment the LAP database, wherein augmenting the LAP database includes at least one of discarding LAPs associated with a total number of sessions below a threshold or discarding LAPs associated with a last seen date exceeding a threshold.

10. The method of claim 1, wherein the LAP database is generated in an unsupervised manner from unlabeled training data including historical sequences of actions performed by historical users during historical sessions, wherein the historical sequences of actions are not labeled based on known anomalies.

11. A system for detecting anomalies in sequences of actions using lookahead pairs (LAPs), the system comprising:

one or more processors; and at least one memory coupled to the one or more processors and storing instructions that, when executed by the one or more processors, cause the system to perform operations including:

receiving, over a communications network, a sequence of actions performed by a user during an active session;

generating a set of LAPs of interest based on the received sequence of actions, wherein generating the set of LAPs of interest includes:

storing recent actions of the sequence of actions in a data structure;

designating a most recent action of the stored recent actions as a fixed target action; and iterating backward through previous actions in the data structure and pairing the fixed target action with one or more of the previous actions, wherein for each respective previous action encountered during the backward iteration, a LAP of interest is generated that indicates (i) the fixed target action most recently performed by the user, (ii) the respective previous action performed by the user before the fixed target action, and (iii) a determined count of intermediate gap actions performed by the user after the performance of the respective previous action and up to the performance of the fixed target action; and selectively flagging the set of LAPs of interest as anomalies based on whether they appear in a LAP database including a plurality of historical LAPs each indicating a previously observed pair of actions and a count of intermediate actions observed between the previously observed pair of actions, the selective flagging including, for each respective LAP of interest:

refraining from flagging the respective LAP of interest as an anomaly if the LAP database indicates that the respective LAP of interest is associated with a frequency count of observances greater than or equal to a minimum threshold; and flagging the respective LAP of interest as an anomaly if the LAP database indicates that the respective LAP of interest is associated with a frequency count of observances less than the minimum threshold or if the respective LAP of interest does not appear in the LAP database.

12. The system of claim 11, wherein:

storing the recent actions of the sequence of actions in the data structure includes:

storing a predefined number of the recent actions in a deque data structure in reverse chronological order; and generating the set of LAPs of interest further includes, for each respective recent action in the sequence of actions:

discarding an oldest action from the deque data structure; and adding the respective recent action to the deque data structure prior to designating the respective recent action as the fixed target action.

13. The system of claim 11, wherein a duration between two consecutive actions in the active session does not exceed a maximum real-time idle duration.

14. The system of claim 11, wherein, for each respective LAP of interest, the determined count of intermediate gap actions is less than or equal to a maximum lookahead value.

15. The system of claim 11, wherein the LAP database is generated based on actions performed by users during a plurality of sessions associated with a plurality of services hosted on a plurality of domains.

16. The system of claim 15, wherein the LAP database indicates a time at which each action was performed, and wherein a duration between two consecutive actions in any given session does not exceed a maximum training idle duration.

17. The system of claim 15, wherein sessions including less than two performed actions are excluded from the LAP database.

18. The system of claim 15, wherein the LAP database indicates, for each historical LAP, at least one of a total number of sessions during which the historical LAP was observed, a total frequency count of observances of the historical LAP over the total number of sessions, an initially seen date indicating an earliest time that the historical LAP was observed, or a last seen date indicating a most recent time that the historical LAP was observed.

19. The system of claim 18, wherein at least one of the total number of sessions, the total frequency count of observances, the initially seen date, or the last seen date are used to augment the LAP database, wherein augmenting the LAP database includes at least one of discarding LAPs associated with a total number of sessions below a threshold or discarding LAPs associated with a last seen date exceeding a threshold.

20. The system of claim 11, wherein the LAP database is generated in an unsupervised manner from unlabeled training data including historical sequences of actions performed by historical users during historical sessions, wherein the historical sequences of actions are not labeled based on known anomalies.

* * * * *